Jan. 22, 1963  D. B. SPALDING  3,074,620
PRESSURE EXCHANGERS
Filed Aug. 20, 1958
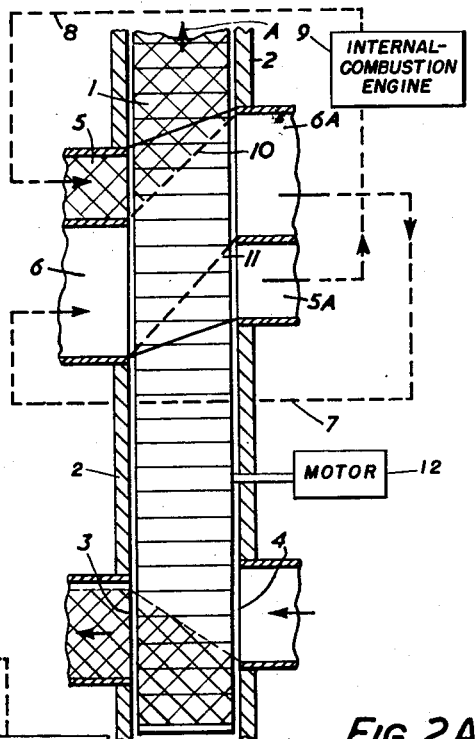
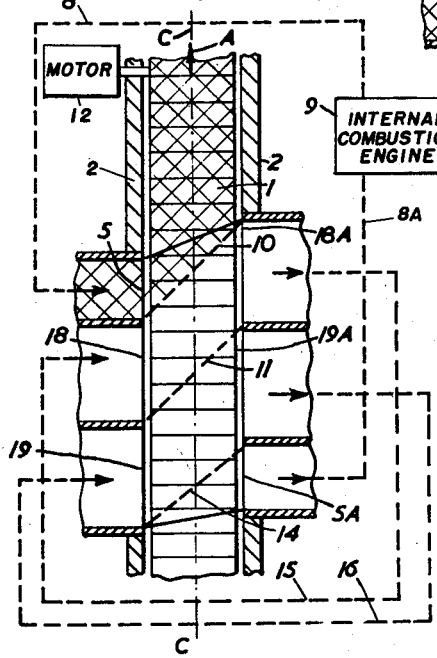
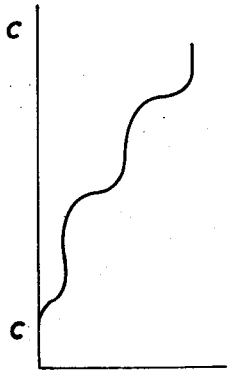
CONCENTRATION OF
EXHAUST PRODUCTS.
INVENTOR
DUDLEY BRIAN SPALDING
ATTORNEY

United States Patent Office

3,074,620
Patented Jan. 22, 1963

3,074,620
PRESSURE EXCHANGERS
Dudley Brian Spalding, 2 Vineyard Hill Road,
London SW. 19, England
Filed Aug. 20, 1958, Ser. No. 756,218
Claims priority, application Great Britain Aug. 29, 1957
3 Claims. (Cl. 230—69)

The invention relates to pressure exchangers and is particularly concerned with pressure exchangers for supercharging internal-combustion engines.

A pressure exchanger comprises cells in which one gas quantity expands so compressing another gas quantity with which it is in direct contact, ducting to lead gas substantially steadily to and from the cells at different pressures, and means to effect relative motion between the cells and the ducting.

It has been proposed previously to employ a pressure exchanger to supercharge an internal-combustion engine by introducing air at atmospheric pressure to cells at a low pressure scavenging stage, compressing air in the cells and discharging compressed air from the cells at a high pressure scavening stage to an induction manifold of the engine. Meanwhile exhaust gas from the engine is introduced to cells of the pressure exchanger at the high pressure scavenging stage and after expansion in the cells, gas is discharged from the cells to atmosphere at the low pressure scavenging stage. The exhaust gas from the engine contains combustion products and therefore it is undesirable to allow the exhaust gas to mix in the cells of the pressure exchanger with air to be discharged to the induction manifold of the engine. In other pressure exchanger plants, for example for the production of an external stream of compressed air, or for carrying out chemical reactions, the mixing of the scavenging gas with that scavenged from the cells is equally undesirable.

According to the present invention pressure exchanger apparatus comprises a series of cells for the compression and expansion of a fluid, the cells being arranged in a ring and having open ends, means defining end walls for the ring of cells and pairs of scavenging ducts communicating with the cells at inlet and outlet pressure fluid ports disposed in opposite end walls on adjacent but circumferentially offset axes, the opening edge of the outlet port being disposed effectively before the opening edge of the inlet port, means for causing relative rotation between the ring of cells and the end walls, and means defining at least one duct communicating with the cells at its ends through buffer fluid ports disposed in opposite end walls on circumferentially offset axes, one of said buffer fluid ports having a projected peripheral span overlapping the outlet pressure fluid port for one of said pairs of scavenging ducts to introduce buffer fluid to the cells in the region thereof and to set up a pressure wave extending from the opening edge of the buffer fluid introduction port to the opening edge of the said outlet pressure fluid port and another of the buffer fluid ports having a projected peripheral span overlapping the inlet pressure fluid port for said one pair of scavenging ducts to withdraw buffer fluid from the cells in the region thereof and to set up a pressure wave extending from the closing edge of the inlet pressure fluid port to the closing edge of the port to withdraw buffer fluid from the cells, whereby in operation a layer of buffer fluid is set up between fluid flows through said inlet and outlet pressure fluid ports.

Two embodiments of the invention will now be described by way of example only with reference to the accompanying diagrammatic drawing in which:

FIGURE 1 shows a peripheral development of a pressure exchanger arranged as a supercharger in which high pressure scavenging ducting includes a single duct for circulating a stream of buffer gas;

FIGURE 2 shows a part of a peripheral development of a pressure exchanger arranged as a supercharger in which high pressure scavenging ducting includes two ducts for circulating a stream of buffer gas; and FIGURE 2A is a graphical diagram exemplifying how the concentration of exhaust products may vary across the high pressure scavenging region along a line C—C in FIGURE 2.

In the figures, similar parts have the same references.

In FIGURE 1, the pressure exchanger comprises a ring of open-ended, axially-extending cells 1 rotatable, by driving means 12, between stationary end-plates 2 in the direction of an arrow A. The end-plates 2 have low-pressure scavenging ports 3 and 4 and high pressure scavenging ports 5 and 5A, port 5 being an inlet port and port 5A being an outlet port. Ducts 8 and 8A indicated by broken lines, connect the ports 5 and 5A to an internal-combustion engine 9. A buffer gas inlet port 6 is positioned cyclically immediately before (in the direction of rotation) the inlet port 5 and this buffer gas inlet port is connected by a duct 7 (indicated by a broken line) to a buffer gas outlet port 6A which is positioned cyclically immediately after (in the direction of rotation) the outlet port 5A.

The operation of the pressure exchanger arranged as a supercharger, will now be described with reference to FIGURE 1 of the drawing. The cell ring 1 rotates relatively to the end-plates 2 in a direction indicated by the arrow A. At the low pressure scavenging stage which includes the ports 3 and 4, fresh air at atmospheric pressure is introduced through the inlet port 4 replacing the exhaust gases which have left the cells through the outlet port 3. The fresh air at atmospheric pressure is compressed in the cells by compression wave effect, cells approaching the high pressure scavenging stage containing air at a pressure of about 1.2 atmospheres. This air leaves the cells at the high pressure scavenging stage through the port 5A under the scavenging action of the gas stream circulating from port 6A through the duct 7 to the inlet port 6. Subsequently exhaust gas from the internal-combustion engine 9 is introduced into the cell ring 1 through the inlet port 5 of the high pressure scavenging stage. This exhaust gas is expanded in the cells and is exhausted to atmosphere through the outlet port 3 of the low pressure scavenging stage.

The exhaust gas in the cells and ducts is indicated by cross-hatching. The boundaries or interfaces between the various gas streams are shown by broken lines 10 and 11. The relatively uncontaminated gas between these two lines acts as a buffer layer between the compressed air stream leaving the cells through the port 5A and the exhaust gas entering the cells through the duct 8 and the inlet port 5. Without this buffer layer, the exhaust gas from the engine which contains combustion products would mix with and hence contaminate the compressed air leaving the cells via the port 5A to flow into the induction manifold of the engine 9. The induction and exhaust manifolds of the engine 9 are not shown in the drawing but it will be clear that the induction manifold is connected to the port 5A by the duct 8A and the exhaust manifold to the port 5 by the duct 8.

The pressure of air in cells at the high pressure scavenging stage ranges from about 2.0–2.1 atmospheres increasing from the air end to the exhaust gas end and in cells leaving the high pressure scavenging stage is about 1.5 atmospheres. The variation of pressure from one end of the high pressure scavenging stage to the other end is due to friction effects in the duct 7. These friction effects can be reduced by making the outlet port 6A of larger cross-sectional area than the inlet port 6.

Slightly more air is introduced at the low pressure scavenging stage inlet port 4 than is required to supercharge the engine 9 and thus the cells are overscavenged at the low pressure scavenging stage. There is ideally no external source of buffer gas, other than initially provided through the port 4, since this gas circulates in the closed duct 7. In operation there is a flow of air within the cells from the interface 11 towards the interface 10. These interfaces are, in practice, not clearly defined and some mixing will occur, so that exhaust gases will diffuse across the interface 10 towards interface 11. There is, in fact, no net gas flow across either interface since the air diffuses turbulently into the exhaust gas region and exhaust gases so diffuse in the reverse direction. The concentration of exhaust gas in the buffer layer falls rapidly from a high level at the exhaust side to substantially zero at the compressed air side.

FIGURE 2 shows an arrangement generally similar to that shown in FIGURE 1. The ports 6 and 6A and their associated ducts of FIGURE 1 are each divided into two to form ports 18 and 19, and 18A and 19A respectively. The ports 18 and 18A are connected by a duct 15 indicated by a broken line and the ports 19 and 19A are connected by a similarly indicated duct 16. The division of the ports and recirculating ducting in this way has the effect of increasing the number of interfaces. In FIGURE 2 there are three interfaces 10, 11 and 14. The interface 10 lies between the exhaust gas and the upper buffer layer (as shown in the drawing), the interface 11 lies between the two buffer layers and the interface 14 lies between air compressed for supercharging and the lower buffer layer.

The mode of operation of the FIGURE 2 embodiment is the same as the embodiment of FIGURE 1 but the additional stream of buffer gas clearly ensures an improved separation of exhaust gases and air.

In both embodiments the streamlines of the buffer layers are substantially closed within the recirculating ducts and cells for the time being in the buffer zone.

What I claim is:

1. Pressure exchanger apparatus comprising a series of cells for the compression and expansion of a fluid, the cells being arranged in a ring and having open ends, means defining end walls for the ring of cells and high and low pressure pairs of scavenging ducts communicating with the cells at inlet and outlet pressure fluid ports disposed in opposite end walls on adjacent but circumferentially offset axes, the high pressure scavenging outlet port being located before the high pressure scavenging inlet port in relation to the direction of rotation of the ring, and means defining at least one duct communicating with the cells at its end through buffer fluid ports disposed in opposite end walls on circumferentially offset axes, the inlet buffer fluid port having a projected peripheral span along lines parallel to the side walls of the cells overlapping at least a portion of the high pressure scavenging outlet port to introduce buffer fluid to the cells in the region thereof, the leading edge of the inlet buffer fluid port being located before the leading edge of the high pressure scavenging outlet port in relation to the direction of rotation of the ring to effect an energy transfer between the fluid of the buffer inlet port and the fluid of the high pressure scavenging outlet port, and the outlet buffer fluid port having a projected peripheral span along lines parallel to the side walls of the cells overlapping at least a portion of the high pressure scavenging inlet port to withdraw buffer fluid from the cells in the region thereof and being so located that an energy transfer is effected between the fluid of the high pressure scavenging inlet port and the fluid of the buffer outlet port whereby a layer of buffer fluid is set up between fluid flows through said inlet and outlet high pressure fluid ports.

2. Pressure exchanger apparatus according to claim 1 wherein the first and second-named buffer fluid ports each have a projected peripheral span greater than and fully overlying the peripheral span of the respective one of said inlet and outlet pressure fluid ports which it overlaps.

3. Pressure exchanger apparatus according to claim 1 further comprising duct means joining said high pressure pair of scavenging ducts in a closed circuit.

References Cited in the file of this patent

UNITED STATES PATENTS

| 2,399,394 | Seippel | Apr. 30, 1946 |
| 2,800,120 | Jendrassik | July 23, 1957 |

FOREIGN PATENTS

| 1,148,082 | France | June 17, 1957 |